Patented Dec. 11, 1928.

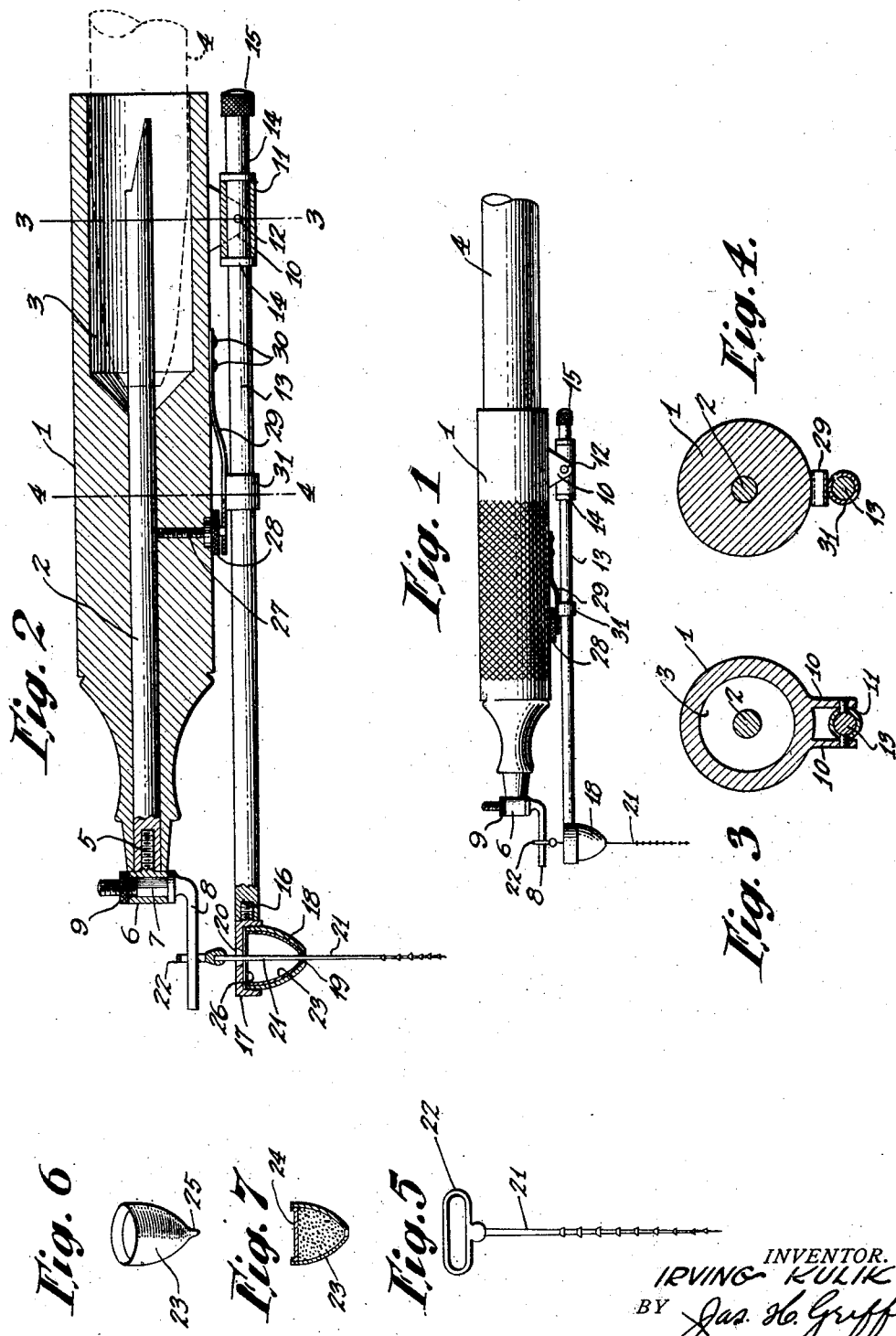

1,694,857

UNITED STATES PATENT OFFICE.

IRVING KULIK, OF BROOKLYN, NEW YORK.

APPARATUS FOR FILLING ROOT CANALS.

Application filed December 3, 1924. Serial No. 753,591.

This invention relates to dentistry and is more particularly directed to the filling of root canals. This field of dentistry is highly important since if the root canals of a tooth are not properly filled breaking down of the organic matter present therein or later seeping thereinto will result in putrefaction, the production of gas and consequent abscesses and the like with resulting pain, discomfort and danger to the health.

The common method employed in filling root canals is to mix the filling material in the form of paste and this material, which is contained in a suitable receptacle supported on the dentist's table is transferred, little by little, to the root canal by means of a small broach. In practice, the dentist dips the broach into a paste and then introduces it into the root canal, thereupon moving the broach up and down until the paste thereon is deposited in the canal. In this manner very small quantities of the paste are successively deposited in the canal. Root canals are small and the dentist has to relocate the orifice of the one to be filled each time after withdrawing the broach for recharging with paste, with the result that much paste is wiped off of the broach before it is actually introduced into the canal. Accordingly, the operation of introducing the broach must be repeated a great number of times and all this while the patient is required to hold his mouth open and generally suffer the discomfort of rubber dams and other appliances utilized to preclude the entrance of saliva and infectious matter into the canal. This is nerve racking both to the patient and dentist and prompts the dentist to extract teeth rather than to attempt to save them by filling especially when the patient is of a nervous temperament. Moreover, even the most conscientious dentist frequently finds it well nigh impossible to properly fill some root canals by the common method outlined.

In my application, Serial No. 691,899, filed February 11, 1924, I disclose a method of and means for filling root canals properly and, in the hands of one skilled in the use thereof, truly remarkable results may be obtained thereby. However, very many dentists who do not possess this skill, may not have the time or inclination to master the use of such means.

With the foregoing considerations in mind, the object of the present invention is to provide simple and efficient means capable of successful operation by inexperienced and untutored operatives to mechanically effect the filling of root canals in an expeditious manner.

Speaking generally, the invention comprises a container or reservoir for holding a supply of filling material in juxtaposition with the tooth to be filled and with this reservoir is associated a broach or other equivalent implement by means of which said material may be transferred directly from the reservoir into the root canal of a tooth. Means are operatively associated with the implement for rapidly reciprocating it alternately into cooperative relation with the material and with the root canal whereby such material is rapidly carried into the canal and firmly impressed therein.

In the preferred form of the invention, provision is made for manually controlling the distance which the implement can penetrate into the canal and the apparatus is also preferably constituted to be connected to and operated by a conventional dental motor, such as is found in the office of all dentists.

Features of the invention, other than those adverted to, will be apparent from the hereinafter detailed description and claims, when read in conjunction with the accompanying drawings.

The accompanying drawings illustrate one practical embodiment of the invention, but the construction therein shown, is to be understood as illustrative, only, and not as defining the limits of the invention.

Figure 1 is a side elevation of an apparatus embodying the present invention.

Figure 2 is a vertical section through the apparatus shown in Figure 1.

Figures 3 and 4 are sections on the lines 3—3 and 4—4 of Figure 2.

Figure 5 is an elevation of an implement used to transfer material from the reservoir into the root canal.

Figure 6 is a perspective view of a cartridge or container for filling material; and Figure 7 is a central section through such cartridge.

Referring to the drawings, 1 indicates a handle which is preferably metallic and of tubular configuration. It is of a size adapting it to be readily grasped in the hand and is sufficiently small to permit it to be conveniently introduced into the mouth of a patient.

Extending longitudinally through the handle and journalled for rotation therein in any suitable manner is a shaft 2, the rear end of the handle being chambered as shown at 3, so that the driving element 4 of a dental engine hand piece may be introduced into the chamber of the handle 1 to operatively engage with the rear end of the shaft 2, whereby said shaft may be driven from the dental engine.

The forward end of the shaft is provided with a tapped hole into which is screwed the threaded shank 5 of a union 6. The union is provided with a polygonal hole therethrough and which hole extends in a direction perpendicular to the axis of the shaft and is adapted to receive the correspondingly shaped shank 7 of a crank 8. A portion of the shank 7 is threaded and is adapted to receive a thumb nut 9, whereby the crank may be firmly though detachably associated with the shaft to be operated thereby.

Near the rear end of the handle, a pair of brackets 10 are provided and between these brackets is pivoted a collar 11, the same being supported in the brackets by means of trunnions 12. A rod 13 is passed through the collar 11 and extends longitudinally along one side of the handle being thereby mounted for pivotal movement with respect to the handle on the trunnions 12. Flanges 14 are fixed on the rod at either end of the collar to preclude longitudinal movement of the rod.

The rear end of the rod is provided with a knurled portion 15, whereby the rod may be grasped and rotated when desired, while the forward end of the rod has a tapped hole into which is adapted to be screwed the shank 16 of a holder 17. The holder 17 is in the form of a cap having a depending skirt which is interiorly threaded and into this threaded portion is adapted to be secured the upper end of a reservoir 18. The bottom of the reservoir is provided with an aperture 19 and the holder 17 is also provided with a vertically alined aperture 20.

The implement 21 which may in practice be similar to a conventional broach is adapted to extend through these alined apertures and is provided at its upper end with a yoke 22 shown best in Figure 5, adapted to embrace a crank 8 as shown most clearly in Figure 2. The broach may vary in construction, but, in practice, I generally use one provided longitudinally with a succession of spaced projections of substantially frusto conical form although any equivalent form of implement may be employed without departing from the invention.

The material for filling root canals is adapted to be positioned within the receptacle 18 and it may be in practice simply packed within the receptacle although I prefer to mix the filling material before and enclose it in a cartridge 23 such as shown in Figure 6. The cartridge may be of gelatin, celluloid or any other suitable material and when made in the form shown in Figure 6 is provided with an upstanding flange around its top and an attenuated tip at its bottom. When it is desired to use the material in the cartridge, the upstanding flange around the periphery at the top of the cartridge is cut away by a knife or scissors thereby releasing the depressed portion 24 of the top which may be thereupon lifted out to uncover the material contained in the cartridge. The tip 25 is next cut off and the reservoir 18 having been removed from the holder 17, the thus formed cartridge is dropped into the reservoir and, being of the same configuration as the reservoir conforms to the interior thereof. I next position over the top of the reservoir a thin rubber disk and thereupon screw the reservoir into the holder 17.

During this operation, the holder 17 is preferably removed from the rod 13 and the implement 21 removed from the reservoir. To reassemble the parts and prepare the device for use, the implement is thrust downwardly through the aperture 20, penetrates the rubber disk or diaphragm, which is designated 26 in the drawings, and passed downwardly through the material and through the aperture 19 at the bottom of the reservoir. The parts thus far assembled are moved in the direction of the left hand end of the instrument in order to cause the crank 8 to pass through the yoke 22 and bring the threaded shank 16 of the holder in juxtaposition with the tapped end of the rod 13.

When this has been accomplished the holder is held against rotation, while the knurled end 15 of the rod is turned, thereby causing the shank 16 to be screwed into the rod to affix the parts in assembled relation. The device is now ready for operation.

The operator first determines the approximate depth of the root canal and having done so, proceeds to adjust the device to permit the implement to penetrate the tooth only to such depth. This result is accomplished by a limiting stop 27, shown best in Figure 2. The stop threads into the handle 1 and may be readily manipulated by the knurled head 28. A leaf spring 29 secured to the side of the handle by rivets or screws 30 has a semicircular saddle 31 embracing the rod 13 and the spring 29 extends beyond this saddle and overlies the outer end of the stop 27. The spring 29 is tensioned to force the rod in an outward direction away from the stop, but when the handle is held in the hand of an operator, one or more fingers of the hand may engage with the rod to overcome the tension of the spring.

In filling a root canal, with the parts as described, the stop is first adjusted so that when the crank is in the position in which it is shown in Figure 2 and the rod drawn tightly against the stop, that portion of the length of the implement which projects beyond the reservoir will be no greater than the depth of the root canal. Having made this adjustment through rotation of the stop, the reservoir is brought into alinement with the root canal of the tooth and may if desired be rested upon the tooth. The power is thereupon turned on and the shaft 2 rotates, resulting in a relatively rapid reciprocation of the implement which causes it when retracted to be charged with filling material from a reservoir and when extended to carry a portion of such material into the root canal. Due care should of course be exercised at the commencement of the operation to insure the alinement between the free end of the implement and the orifice of the root canal, but when this has been obtained the operator can hold the device steady while the rapid reciprocation of the implement carries the material, little by little, into the tooth resulting in an expeditious filling of the canal.

During this operation, the receptacle resting upon the tooth constitutes a guide, while the adjustment of the depth of travel of the implement into the root canal is adjusted by the pressure of the fingers to overcome the tension of the spring 29 to a greater or lesser extent as may be required. It will of course be understood that at the start of the operation, the broach should penetrate substantially to the base of the root canal but as the operation proceeds and the canal becomes filled the pressure is released to decrease the penetration of the implement until the canal is fully filled.

The implement will manifestly operate with appreciable force and will cause a tight impressing of the material in the canal which will insure a complete and efficient filling thereof. The rubber diaphragm 26, to which I have referred, is of considerable practical utility, as it not only serves as a gasket between the holder and the reservoir, but it moreover conforms to the shank of the implement and precludes the filling material from working out through the aperture 20. The little material that may work out through the bottom aperture 19 is not serious as it will be carried directly within the tooth by the implement and will be fed thereby into the root canal.

It is found in practice that an apparatus constructed and functioning as described may be used by relatively unskilled operatives to produce very successful results in the filling of root canals and a very important consideration is inherent in the fact that the work is rapidly accomplished thereby minimizing nervous strain on both a dentist and a patient and the time which the patient is required to sit with his mouth open and in an abnormal position of discomfort.

The foregoing detailed description deals with the invention in its preferred practical form, but it will be understood that the invention is fully commensurate with the appended claims, since so far as I am aware, I am the first to provide mechanical means for efficiently and expeditiously effecting the filling of root canals.

Having thus fully described the invention what I claim as new and desire to secure by Letters Patent is:

1. An apparatus for filling root canals embodying a receptacle adapted to be juxtaposed with a tooth to be filled and to contain material for filling the root canal of such tooth, an implement mounted to move into and out of the root canal, while in contact with the material in the reservoir for the purpose of transferring the material from the reservoir into the root canal, and means for operatively connecting said implement to a dental engine hand piece for operation by the latter.

2. An apparatus for filling root canals embodying an implement mounted to reciprocate into and out of the root canal of a tooth, and means, operable by a dental engine hand piece for feeding filling material to the implement during reciprocation thereof.

3. An apparatus for filing root canals embodying a reservoir adapted to contain filling material, an implement extending through the reservoir and through the material contained therein, and means, operatively connecting said implement to a dental engine hand piece, for reciprocating said implement into and out of the root canal for the purpose of effecting the transfer of the filling material from the reservoir into the root canal of a tooth in juxtaposition with which the apparatus is positioned.

4. An apparatus for filling root canals embodying a reservoir adapted to contain filling material, an implement extending through the reservoir and through the material contained therein, and a crank for imparting reciprocating movement to the implement to move it into and out of the root canal.

5. An apparatus for filling root canals embodying an implement mounted to move into and out of a root canal, means for applying filling material to said implement during such movement, and means for controlling the extent to which the implement can penetrate into said canal.

6. An apparatus for filling root canals embodying an implement, means for holding said implement in substantial alinement with the root canal of a tooth, power mechanism operatively connected with said implement for reciprocating the implement into and out of the root canal, and means for charging the implement with filling material during such reciprocation.

7. An apparatus for filling root canals embodying a reservoir containing filling material and adapted to be held in engagement with a tooth, an implement passing through said reservoir and mounted to reciprocate into and out of a root canal of such tooth, and means for operating said implement.

8. An apparatus for filling root canals embodying a reservoir containing filling material and adapted to be held in engagement with a tooth, an implement passing through said reservoir and mounted to reciprocate into and out of a root canal of such tooth, means for operating said implement, and manually controllable means for regulating the extent to which the implement can penetrate into said root canal.

9. An apparatus for filling root canals embodying a receptacle adapted to contain filling material, and a broach mounted to reciprocate through and to the exterior of said receptacle and into the root canal to carry said material from the receptacle into the root canal of a tooth.

10. An apparatus for filling root canals embodying a handle, a shaft carried thereby for rotation and adapted to be operatively connected to a dental hand piece, a crank carried by the shaft, and an implement connected to the crank, in combination with a receptacle adapted to contain filling material and having openings through which the implement extends, said implement being in contact with the material within the receptacle.

11. An apparatus for filling root canals embodying a handle, a shaft carried thereby for rotation and adapted to be operatively connected to a dental hand piece, a crank carried by the shaft, an implement connected to the crank, in combination with a receptacle adapted to contain filling material and having openings through which the implement extends, said implement being in contact with the material within the receptacle, and means mounting the receptacle on the handle for adjustment radially of the axis of the shaft to control the extent to which the free end of the receptacle can protrude beyond the receptacle.

12. An apparatus for filling root canals embodying a handle, a shaft carried thereby for rotation and adapted to be operatively connected to a dental hand piece, a crank carried by the shaft, and an implement operatively connected to the crank, in combination with an arm pivoted to the handle, a receptacle containing filling material and carried by said arm and having openings through which the implement projects, means for normally impelling the arm to move the receptacle in a direction away from the axis of the shaft, and a stop for limiting movement of the arm in the direction of said axis.

13. A filling reservoir of constant volume for tooth filling apparatus, having rigid walls with openings at both ends, and a perforatable seal for normally sealing one of said openings.

14. A rigid filling reservoir for tooth filling apparatus, having a normally open aperture at one end and normally sealed at its other end by a perforatable seal.

15. A reservoir for filling the pulp chamber and root canals of a tooth, which reservoir is rigid and is tapered for a part of its length and is opened at its smaller end and closed at its larger end by a perforatable seal.

16. A reservoir for filling the pulp chamber and root canals of a tooth, which reservoir is threaded at one end, the smaller end of the reservoir being opened and the larger end of the tube being provided with a perforatable seal, and means for detachably maintaining the seal on the reservoir.

17. A reservoir for filling the pulp chamber and root canals of a tooth, which reservoir is exteriorly threaded at one end, the smaller end of the reservoir being opened and the larger end of the reservoir being provided with a perforatable seal, and a threaded clamping member for detachably mounting the perforatable seal on the reservoir.

18. A cartridge for use with tooth filling apparatus, comprising a hollow container provided at one end with a projecting flange adapted to be cut away to disconnect a part of the wall of the container from the remainder thereof.

19. A cartridge for use with tooth filling apparatus, comprising a hollow container having an end wall connected to the side wall in a flange adapted to be cut away to disconnect the end wall from said side wall.

20. A cartridge for use with tooth filling apparatus, comprising a hollow container having an end wall connected to the side wall in a flange adapted to be cut away to disconnect the end wall from said side wall and open one end of the container, and the other end of the container being in the form of a tip adapted to be cut off to open the latter end of the container.

In testimony whereof I have signed the foregoing specification.

IRVING KULIK.